Aug. 31, 1965 R. D. McMAHAN 3,203,476
AIR DIFFUSER AND DISPENSER FOR AUTOMOTIVE VEHICLES
Filed Oct. 25, 1963 2 Sheets-Sheet 1
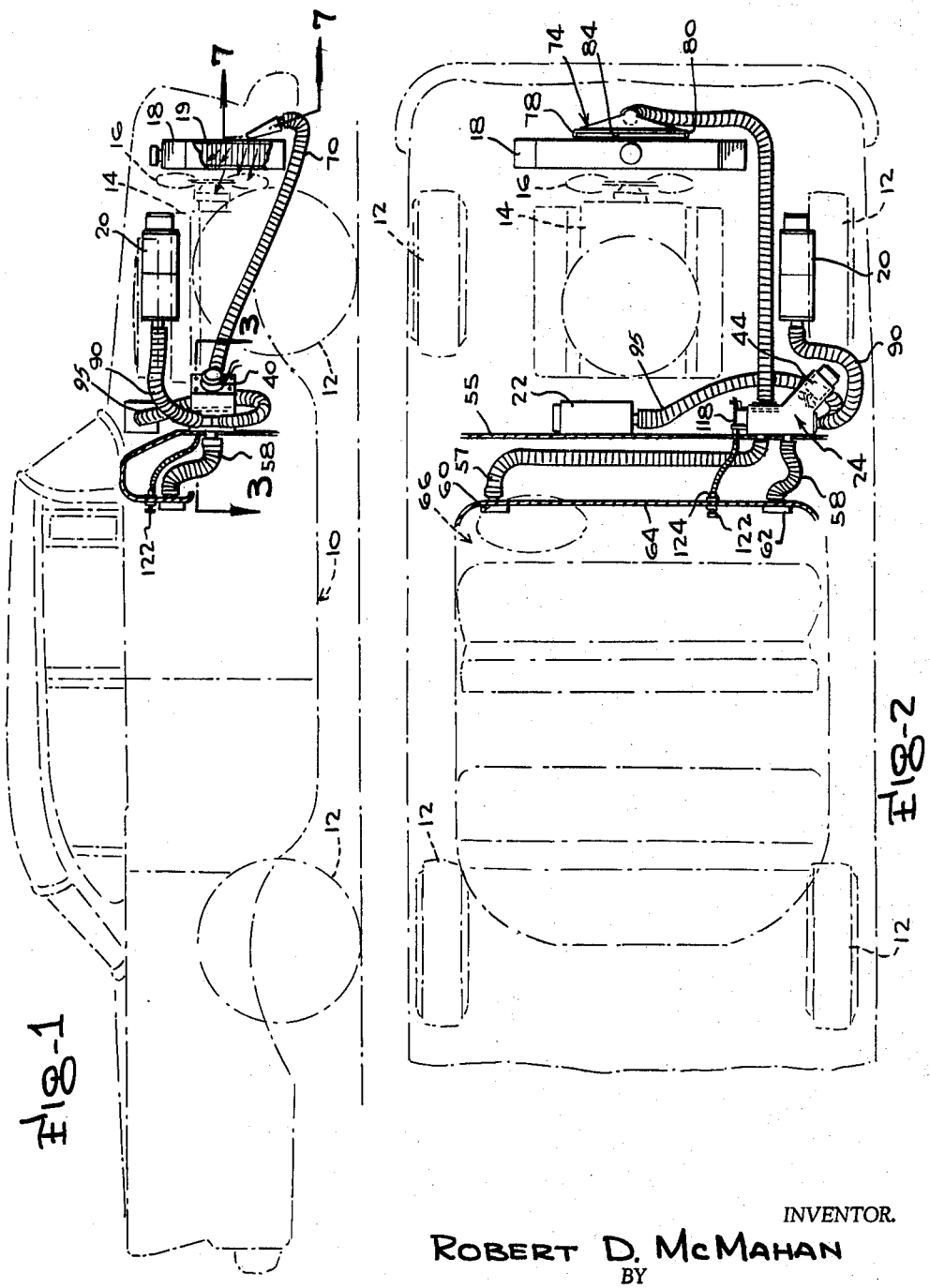
INVENTOR.
ROBERT D. McMAHAN
BY
McMorrow, Berman & Davidson
ATTORNEYS

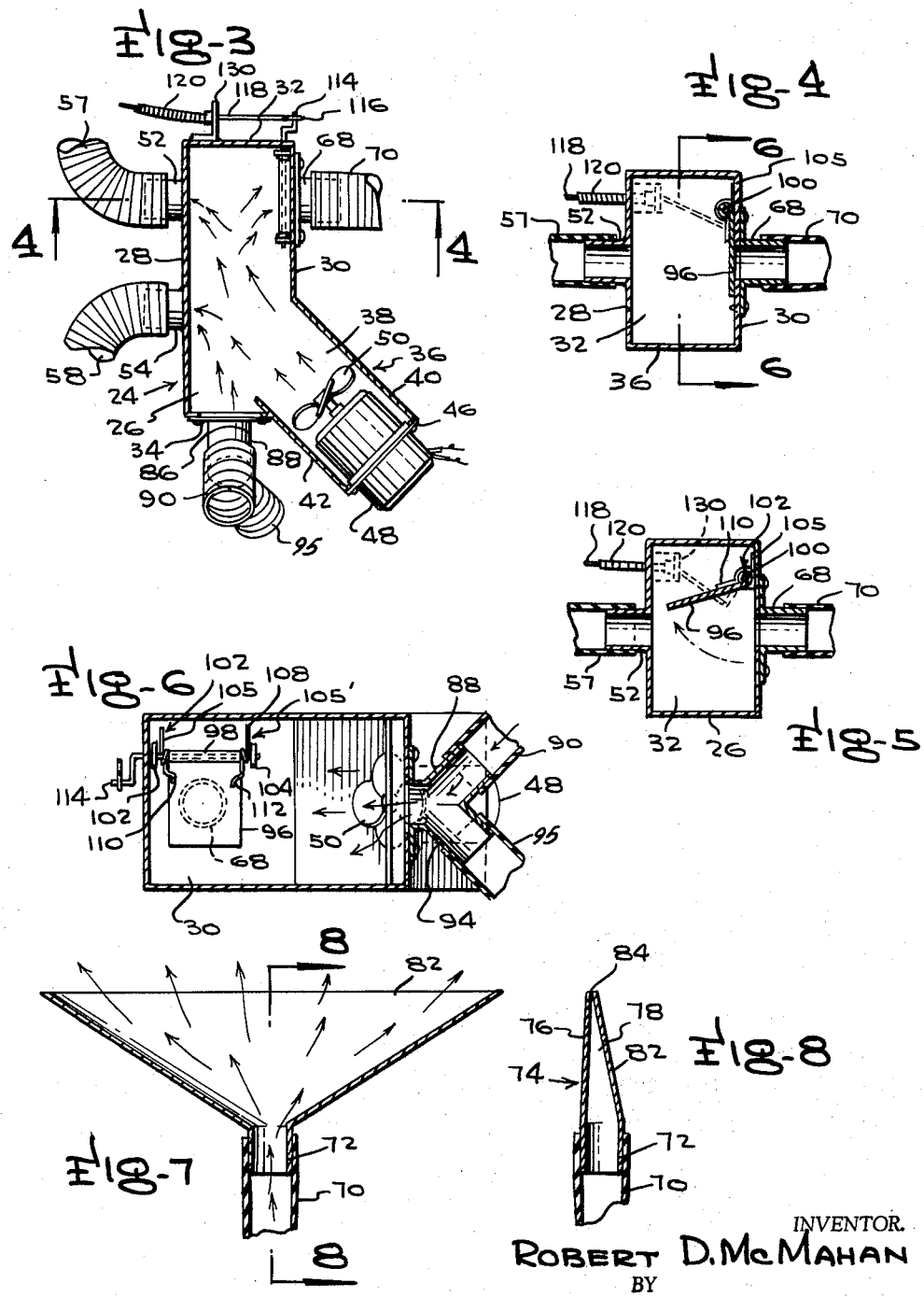

United States Patent Office 3,203,476
Patented Aug. 31, 1965

3,203,476
AIR DIFFUSER AND DISPENSER FOR
AUTOMOTIVE VEHICLES
Robert D. McMahan, 830 Esperson Bldg., Houston, Tex.
Filed Oct. 25, 1963, Ser. No. 318,965
3 Claims. (Cl. 165—42)

This invention relates to the general field of heat-exchange devices and, more specifically, the instant invention pertains to a new and novel combination of elements for heating or cooling the radiator of a vehicle motor-cooling system.

The performance or efficiency of any internal combustion engine, especially automotive vehicle engines, is dependent, to some extent, upon the effectiveness of its cooling system. Should the motor be operated too cold or too hot, some of the efficiency of the motor is lost and there is ever present the danger of damaging some of the moving elements of the motor. Thus, one of the primary objects of this invention, is to provide heating and cooling means for vehicle motors whereby the same may be operated at optimum temperatures.

Most of the internal combustion engines for automotive vehicles as presently constructed include a cooling means therefor generally in the nature of a radiator which is adapted to contain a cooling liquid and a fan driven from the engine which forces a flow of air through the radiator. These means in and by themselves are inefficient to either raise or lower the temperature of the coolant until the same reaches the desired temperature whereby the motor will operate at its optimum efficiency.

A further object of this invention is to provide heating or cooling means for vehicle motors employing a liquid cooling system including a radiator, the means being so constructed as to cause a continuous stream of, optionally, heated air or cooled air directly across and through the radiator core until the vehicle motor operates with peak efficiency.

Still another object of this invention is to provide heating or cooling means for directing an air stream across a vehicle radiator together with means for supplying all of the heated or cooled air to the passenger compartment of the vehicle or diverting a part thereof for direction across the radiator.

This invention contemplates, as a still further object thereof, the provision of means of the type generally described supra, which is non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURES 1 is a side elevational view of means for heating the radiator of an automotive vehicle, and constructed according to this invention, the automotive vehicle being shown in phantom lines;

FIGURE 2 is a top plan view of the means shown in FIGURE 1;

FIGURE 3 is an enlarged detail cross-sectional view, FIGURE 3 being taken substantially on the horizontal plane of line 3—3 of FIGURE 1, looking in the direction of the arrows;

FIGURE 4 is a detail cross-sectional view showing the air control valve in its closed position, FIGURE 4 being taken substantially on the horizontal plane of line 4—4 of FIGURE 3, looking in the direction of the arrows;

FIGURE 5 is a detail cross-sectional view similar to FIGURE 4, but showing the air control valve in its open position;

FIGURE 6 is a detail cross-sectional view, FIGURE 6 being taken substantially on the vertical plane of line 6—6 of FIGURE 4, looking in the direction of the arrows;

FIGURE 7 is a detail enlarged view of the air distribution nozzle, FIGURE 7 being taken substantially on the line 7—7 of FIGURE 1, looking in the direction of the arrows; and FIGURE 8 is a fragmentary detail cross-sectional view, FIGURE 8 being taken substantially on the vertical plane of line 8—8 of FIGURE 7, looking in the direction of the arrows.

Referring now more specifically to the drawings, reference numeral 10 designates, in general, a conventional automotive vehicle shown in phantom lines and including the usual wheels 12, internal combustion engine or motor 14, a motor-driven fan 16, and a conventional radiator 18, the latter being shown in full lines.

Reference numeral 20 designates the usual conventional air conditioner for an automotive vehicle, the air conditioner being designated by the reference letters A.C., and the air conditioner may be supported within the vehicle by any suitable means, not shown.

Reference numeral 22 designates a conventional air heater bearing the reference letter H, the heater 22 being secured to the firewall 55, or otherwise suitably supported on the vehicle by means not shown.

The air collector designated at 24 is essentially rectangular in configuration and comprises an elongated substantially rectangular bottom wall 26 having a pair of laterally-spaced substantially rectangular and parallel sidewalls 28, 30 projecting upwardly from the longitudinally-extending marginal edges thereof, and opposed substantially rectangular and parallel end walls 32, 34. The sidewall 30 is intersected by a substantially rectangular insert 36 including the substantially rectangular bottom wall 38 from which rise the laterally-spaced and substantially parallel rectangular sidewalls 40, 42 and a top wall 44. Inset within the end wall 46 is an electric motor 48 which drives an air propeller 50.

Referring now more specifically to FIGURE 3 of the drawings, it is seen that the sidewall 28 is provided with a pair of longitudinally-spaced air outlet nozzles 52, 54 which extend through the usual firewall 56 (see FIGURE 2) for connection with one of the ends of a pair of flexible hollow cylindrical conduits 57, 58, respectively. The other ends of the conduits 57, 58 terminate in outlet nozzles 60, 62 supported in the dashboard 64 for air discharge into the compartment 66 of the vehicle 10.

A third outlet nozzle 68 (see FIGURE 3) projects from the sidewall 30 and connects through the flexible hollow cylindrical conduit 70 with the hollow cylindrical boss 72 of an air diffuser 74 supported by an suitable means (not shown) in front of the radiator 18. The air diffuser 74 includes a substantially triangular flat back wall 76 which merges with opposed sidewalls 78, 80 that, in turn, connect with the substantially flat triangular front wall 82. As is seen in FIGURES 2, 7 and 8, the outer ends of the back and front walls 76, 78, respectively, are spaced apart to form an air-discharge slot 84. The arrangement is such that the air discharged from the slot 84 will travel through the core 19 of the radiator 18 in the direction of the arrows shown in FIGURE 1.

From the end wall 34 projects a T-connector 86 having an arm 88 connected with one end of an elongated flexible conduit 90, the other end of the conduit 90 being connected to the output side of a conventional air conditioner 20, the latter being designated by the reference letters A.C. The other arm 94 of the T-connector 86 (see FIGURE 6) connects with one end of a hollow flexible conduit 95 having its other end connected with the outlet side of a conventional air heater 22. The air conditioner 20 and the air heater 22 are, of course, provided with the conventional dashboard controls (not shown) to provide for the seasonable use thereof.

Disposed within the air collector 24 is a flap valve 96 which is adapted to open and close across the nozzle 68. As is seen in the drawings, specific reference being made to FIGURES 3 to 6, inclusive, the flap valve 96 is essentially rectangular in configuration and is reverted at its upper end in order to form a substantially hollow sleeve 98 through which extends one end of a shaft 100. The shaft 100 is supported adjacent its opposed ends in brackets 102, 104 which project laterally from the wall 30. The shaft 100, adjacent each end thereof, is provided with helicoidal springs 105, 105' having ends 106, 108 which abut against the sidewall 30, and a second pair of ends 110, 112, which are inwardly-turned to abut against the upper end of the flap valve 96.

From the described elements it will be obvious that the flap valve 96 is constantly biased for movement to its closed position across the nozzle 68.

The other end of the shaft 100 terminates in a crank arm 114 which, in turn, is connected through the eye 116 at one end of an elongated flexible wire 118 which passes through a flexible sheathing 120 and terminates in a button 122 connected at its other end. As is seen in FIGURE 2 of the drawings, the wire 118 and the sheath 120 terminate in a coupling 124 on the dashboard 64 of the automotive vehicle. The button 122, when drawn outwardly away from the dashboard 64, causes the flap valve 96 to move from its normally closed position, as is seen in FIGURE 4, to its open position, as is illustrated in FIGURE 5. Pushing the button 122 in the reverse direction causes the valve 96 to move from its open position, as shown in FIGURE 5, to its closed position, as is shown in FIGURE 4. To facilitate the operation of the wire 118, it has been found advisable to extend the same through a support bracket 130 mounted on the wall 32 and projecting laterally therefrom.

From the foregoing description it should now be obvious that the arrangement of the component elements of this invention is such that in cold weather and assuming that the motor 14 is in operation and that the air heater 22 is being driven, hot air from the heater 22 will be delivered to the air collector 24 through the flexible conduit 95 for distribution through the conduits 57, 58 and the nozzles 60, 62 into the compartment 66 of the vehicle 10. As the air heater 22 reaches it maximum operating capacity, the valve 96 may be opened to divert, in part, the air drawn into the air collector by the electric motor 48 and its propeller 50 so that heated air can be delivered, in part, through the conduit 70 to the air diffuser 74 for exhaust through the slot 84 for distribution through the core 19 of the radiator 18. This, in effect, tends to warm the liquid passing through the radiator 18 so that the motor 14 is warmed to its normal operating temperature.

Conversely, and depending upon the season, the air heating means 22 may be rendered inoperative, and the air conditioner 20 placed in operation. In this circumstance, the output side of the air conditioner 20 is led through the conduit 90 into the air collector 24 from where the cooled air is conducted through the conduits 57, 58 to the nozzles 60, 62 for discharge into the compartment 66 of the vehicle 10. As before, a part of this cooled air may be diverted by the opening of valve 96, whereby the cooled air will pass through the conduit 70 for discharge through the slotted end 84 of the air diffuser 74. This type of cooling for the radiator 18 is especially beneficial when weather conditions are extremely warm or when the automotive vehicle is operated in extremely high altitudes, or when auto is idling.

The manually-controlled valve 96 provides insurance that the radiator 18 and the liquid circulating therethrough may be subjected to either the heating or cooling means, whichever is deemed necessary under the vehicle operating conditions. Obviously, the manually-controlled valve 96 may be supplanted by a thermostatically-operated valve, if desired.

Having described and illustrated one embodiment of this invention, it will be understood that the same is offered merely by way of example, and that this invention is to be limited only by the scope of the appended claims.

What is claimed is:

1. The combination with a vehicle having a compartment and a radiator core, of an air diffusing and dispensing device for distributing air over the radiator core comprising a pair of superposed substantially flat triangular plates disposed in laterally-spaced relation and having an air-discharge slot adjacent the bases of the plates, said slot being juxtaposed relative to said core, the apices of said plates being joined to form a hollow boss, an air collector mounted on said vehicle, said air collector comprising a substantially hollow rectangular compartment defined by a substantially rectangular bottom wall having substantially rectangular sidewalls projecting from the longitudinally-extending marginal edges thereof, respectively, a pair of end walls oppositely-disposed relative to one another, and a top wall extending over said side and end walls, an electric motor mounted in one of said side walls and having an air propeller connected therewith in driving relation relative thereto, said air collector having a pair of air outlets connected with said compartment, a conduit connecting said boss with said air collector, and means selectively operable to connect said air collector with an air conditioner.

2. The combination according to claim 1, which includes in addition to valve interposed between said air collector and said conduit.

3. The combination according to claim 2, which includes in addition means constantly biasing said valve for movement to its closed position across said conduit.

References Cited by the Examiner

UNITED STATES PATENTS

| | | | |
|---|---|---|---|
| 1,870,374 | 8/32 | Mihaliak | 98—2.4 X |
| 2,119,402 | 5/38 | Puffer | 165—48 X |
| 2,325,901 | 8/43 | Atkinson | 98—2 |
| 2,333,818 | 11/43 | Raney | 237—12.3 |
| 2,770,445 | 11/56 | MacCracken | 165—48 |
| 2,876,998 | 3/59 | Csabi | 237—12.3 X |
| 3,028,800 | 4/62 | Anderson | 98—2.4 |

ROBERT A. O'LEARY, *Primary Examiner.*

CHARLES SUKALO, *Examiner.*